United States Patent
Chang et al.

(10) Patent No.: US 9,830,030 B2
(45) Date of Patent: Nov. 28, 2017

(54) FLEXIBLE TOUCH PANEL, TOUCH CONTROL DEVICE AND OPERATING METHOD USING THE SAME

(71) Applicant: INDUSTRIAL TECHNOLOGY RESEARCH INSTITUTE, Hsinchu (TW)

(72) Inventors: Tsu-Chiang Chang, New Taipei (TW); Chien-Ju Lee, Taoyuan (TW); Kai-Ming Chang, New Taipei (TW); Heng-Yin Chen, Zhubei (TW); Yu-Sheng Tsai, Hsinchu (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 0 days.

(21) Appl. No.: 14/706,618

(22) Filed: May 7, 2015

(65) Prior Publication Data

US 2016/0328042 A1    Nov. 10, 2016

(51) Int. Cl.
*G06F 3/044* (2006.01)
*G06F 1/16* (2006.01)
*G06F 3/041* (2006.01)

(52) U.S. Cl.
CPC ............ *G06F 3/044* (2013.01); *G06F 1/1652* (2013.01); *G06F 3/0416* (2013.01); *G06F 2203/04102* (2013.01)

(58) Field of Classification Search
CPC ...... G06F 3/016; G06F 1/1652; G06F 3/0412; G06F 2203/04102
See application file for complete search history.

(56) References Cited

U.S. PATENT DOCUMENTS

| | | |
|---|---|---|
| 8,654,095 B1 | 2/2014 | Cho et al. |
| 2003/0227441 A1* | 12/2003 | Hioki ............ G06F 3/0412 345/156 |
| 2006/0050169 A1 | 3/2006 | Misawa |
| 2006/0279548 A1 | 12/2006 | Geaghan |
| 2008/0303782 A1 | 12/2008 | Grant et al. |
| 2010/0295761 A1 | 11/2010 | van Lieshout et al. |
| 2011/0043484 A1 | 2/2011 | Huang et al. |
| 2012/0019482 A1 | 1/2012 | Wang |

(Continued)

FOREIGN PATENT DOCUMENTS

| | | |
|---|---|---|
| CN | 1744803 A | 3/2006 |
| CN | 102200851 A | 9/2011 |

(Continued)

OTHER PUBLICATIONS

Taiwanese Office and Search Report dated Sep. 23, 2015 for Application No. 103102674.
Taiwanese Office Action and Search Report for Taiwanese Application No. 104120720, dated May 26, 2016.

(Continued)

*Primary Examiner* — Kevin M Nguyen
(74) *Attorney, Agent, or Firm* — Birch, Stewart, Kolasch & Birch, LLP (57) ABSTRACT

A touch control device comprises a flexible touch panel, a sensor and a controller. The flexible touch panel receives a touch input. The sensor detects a bending of the flexible touch panel. The controller drives the flexible touch panel with a load drive capability setting and adjusts the load drive capability setting according to the bending of the flexible touch panel.

20 Claims, 6 Drawing Sheets

(56) References Cited

U.S. PATENT DOCUMENTS

| | | |
|---|---|---|
| 2013/0162546 A1 | 6/2013 | Yeh et al. |
| 2013/0241854 A1 | 9/2013 | Yoo |
| 2013/0285951 A1 | 10/2013 | Jeon et al. |
| 2013/0300677 A1 | 11/2013 | Kim et al. |
| 2013/0328803 A1 | 12/2013 | Fukushima et al. |
| 2014/0002402 A1 | 1/2014 | Kang et al. |
| 2014/0028596 A1* | 1/2014 | Seo ................. G06F 3/0487 345/173 |
| 2014/0055394 A1* | 2/2014 | Park ................ H01L 41/0825 345/173 |
| 2014/0062859 A1* | 3/2014 | Lee ..................... G06F 3/01 345/156 |
| 2014/0218321 A1 | 8/2014 | Lee et al. |
| 2014/0347287 A1* | 11/2014 | Lee ................... G06F 1/1652 345/173 |
| 2015/0212621 A1 | 7/2015 | Pan et al. |

FOREIGN PATENT DOCUMENTS

| | | |
|---|---|---|
| CN | 103578359 A | 2/2014 |
| JP | 2007-102759 A | 4/2007 |
| TW | 200710705 A | 3/2007 |
| TW | 201346686 A | 11/2013 |
| TW | I431363 B | 3/2014 |
| TW | 201426440 A | 7/2014 |
| TW | I450235 B | 8/2014 |

OTHER PUBLICATIONS

U.S. Office Action for U.S. Appl. No. 14/317,923, dated Jul. 26, 2016.

* cited by examiner

FLEXIBLE TOUCH PANEL, TOUCH CONTROL DEVICE AND OPERATING METHOD USING THE SAME

TECHNICAL FIELD

The disclosure relates in general to a flexible touch panel, a touch control device and an operating method using the same.

BACKGROUND

Recently, touch panels have been widely used in devices of portable terminals, such as mobile phones, tablets, notebooks and personal computers. Furthermore, in advanced portable terminals, there is a demand for flexible types to replace the rigid types of the conventional art. Thus, a so-called flexible touch panel is developed, which can be bended by a force applied by a user.

However, once a flexible touch panel is bended, its circuit characteristic changes accordingly, and possibly introduces unwanted touch interference. Therefore, there is a need to provide a technology to deal with the above issues.

SUMMARY

The disclosure is directed to a flexible touch panel, a touch control device and an operating method using the same.

According to an embodiment of the present disclosure, a touch control device is provided. The touch control device comprises a flexible touch panel, a sensor and a controller. The flexible touch panel is to receive a touch input. The sensor is to detect a bending of the flexible touch panel. The controller is to drive the flexible touch panel with a load drive capability setting and to adjust the load drive capability setting according to the bending of the flexible touch panel.

According to another embodiment of the present disclosure, an operating method of a touch control device is provided. The touch control device comprises a flexible touch panel to receive a touch input and a controller to drive the flexible touch panel. The operating method comprises: a bending of the flexible touch panel is detected; a load drive capability setting of the controller is adjusted according to the bending of the flexible touch panel; and the flexible touch panel is driven with the load drive capability setting.

According to an alternative embodiment of the present disclosure, a flexible touch panel is provided. The flexible touch panel comprises a plurality of scanning lines transferring scanning signals; a plurality of sensing lines intersected with the scanning lines and providing responses of a touch input in terms of the scanning signals; wherein the scanning signals are adjusted according to a bending state of the flexible touch panel.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

The proposed disclosure provides a technology for a flexible touch panel having various bending types. A controller (e.g., a driving integrated circuit (IC)) for driving the flexible touch panel may dynamically adjust its load drive capability setting to meet the RC load corresponding to the current bending type of the flexible touch panel, so that the overall power consumption of the touch control device can be reduced.

Figure 1:
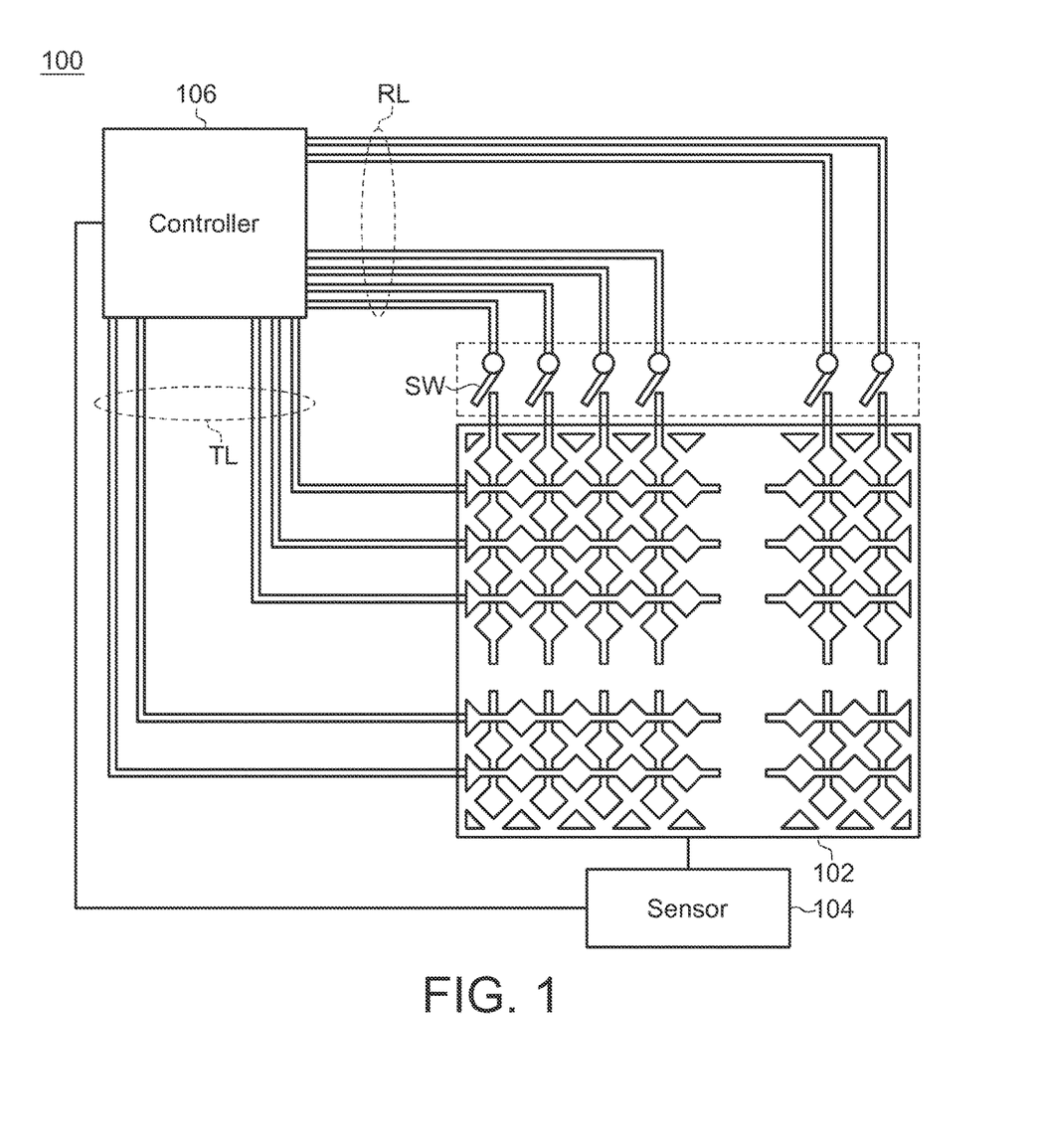
FIG. 1 shows a touch control device according to an embodiment of the present disclosure.

FIG. 1 shows a touch control device 100 according to an embodiment of the present disclosure. The touch control device 100 comprises a flexible touch panel 102, a sensor 104 and a controller 106. The flexible touch panel 102, such as a double-sided indium tin oxide (DITO) touch panel, a single-sided ITO (SITO) touch panel or any other touch panel can be bended, is arranged to receive a touch input. For example, a user can control the touch control device 100 through simple or multi-touch gestures by touching the flexible touch panel 102 with one or more fingers.

In FIG. 1, the flexible touch panel 102 includes a plurality of scanning lines TL and a plurality of sensing lines RL intersected with the scanning lines TL. The scanning lines TL may transfer scanning signals to detect touch inputs applied on the flexible touch panel 102. When a touch input is detected, the sensing lines RL may transmit responses of the touch input in terms of the scanning signals back to the controller 106, such that the touch location/trace of the touch input can be recognized.

In an embodiment, each of the sensing lines RL may include a switch SW. When the switch SW is tuned on, the corresponding sensing line RL is deemed as an activated line that is able to transmit the signals back to the controller 106. In contrast, when the switch SW is tuned off, the corresponding sensing line RL is deemed as a deactivated line that blocks any feedback to the controller 106. In the present disclosure, by selectively deactivating the sensing lines, unwanted touch interference resulted from a non-operational touch region of the flexible touch panel can be avoided. The wiring and the activation/deactivation mechanism of the sensing lines will be explained in detail below with reference to FIGS. 5-7.

The sensor 104 is arranged to detect a bending of the flexible touch panel 102. For example, the sensor 104 may be embedded in the flexible touch panel 102 to detect a bending degree/speed/deformation at a bending location (e.g., a folded axis) of the flexible touch panel 102. The sensor 104 may be a bending sensor, an optical sensor, a pressure sensor, an accelerometer, or any other sensor that can be used to detect the bending of the flexible touch panel 102. In an embodiment, the sensor 104 can be implemented by a plurality of sub-sensors that are separately located in the flexible touch panel 102 to provide the controller 106 bending information of the flexible touch panel 102.

The controller 106 is to drive the flexible touch panel 102 with a load drive capability setting. According to the bending of the flexible touch panel 102 detected by the sensor 104, the controller 106 may adjust its load drive capability setting to meet the current bending type of the flexible touch panel 102. That is, if the bending of the flexible touch panel 102 satisfies a predetermined condition, the controller 106 may choose a corresponding load drive capability setting to drive the flexible touch panel 102.

The rational behind such design is that as the bending type of the flexible touch panel 102 changes, the RC load the controller 106 sees may become different. For example, a capacitance difference between the folded and un-folded states of a flexible touch panel may be up to 0.27 pF, which refers to a 6% capacitance change in general driving IC spec. This also means that sometimes the controller 106 may use lower load drive capability to drive the flexible touch panel 102, rather than using a fixed, maximized load drive capability to cover all possible bending types of the flexible touch panel 102. Thus, by dynamically adjusting the load drive capability of the controller 106, the low-power requirement can be achieved.

Figure 2:
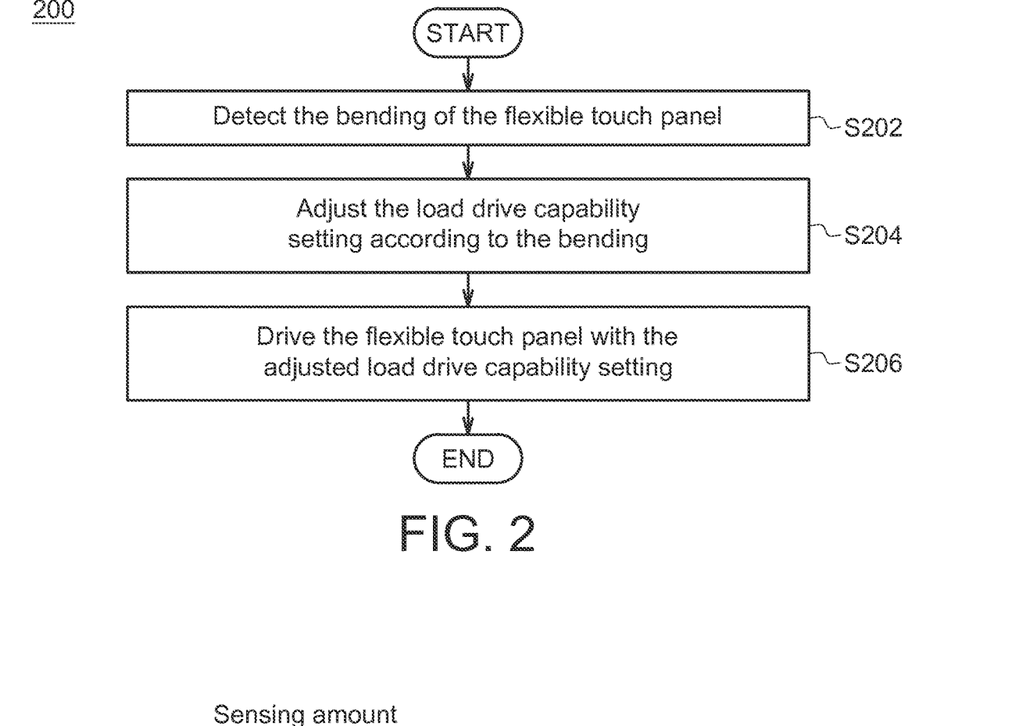
FIG. 2 is a flowchart of an operating method of the touch control device according to an embodiment of the present disclosure.

FIG. 2 is a flowchart 200 of an operating method of the touch control device 100 according to an embodiment of the present disclosure. As shown in FIG. 2, after the sensor 104 detects the bending of the flexible touch panel 102 (step S202), the controller 106 may adjust its load drive capability setting according to the bending of the flexible touch panel 102 (step S204), and then driving the flexible touch panel 102 with the adjusted load drive capability setting (S206).

The adjustment of the load drive capability setting may be implemented by various ways. For example, the controller 106 may modify the scanning signals to adjust the load drive capability setting, such as changing the number/duty cycle/frequency of the scanning signals.

In an embodiment, the touch control device 100 may pre-store a plurality of predetermined load drive capability settings that each of which is for a bending state of the flexible touch panel 102. Then, according to the bending of the flexible touch panel 102, the controller 106 may select one of the predetermined load drive capability settings as the load drive capability setting to perform panel driving. The bending states for the predetermined load drive capability settings may include one or more predefined states, such as a first state indicating that the flexible touch panel 102 is folded or curved and a second state indicating that the flexible touch panel 102 is un-folded or non-curved. Note that while the above only shows two examples for the possible bending states, it is understood that the present disclosure is not limited in this respect, as any type of the bending state can be defined according to the practical panel design.

In another embodiment, without pre-storing a plurality of predetermined load drive capability settings, the touch control device 100 may keep monitoring and analyzing the current bending state of the flexible touch panel 102 based on the bending information obtained from the sensor 104, and dynamically adjusting its load drive capability setting for the flexible touch panel 102 in real time.

Figure 3:
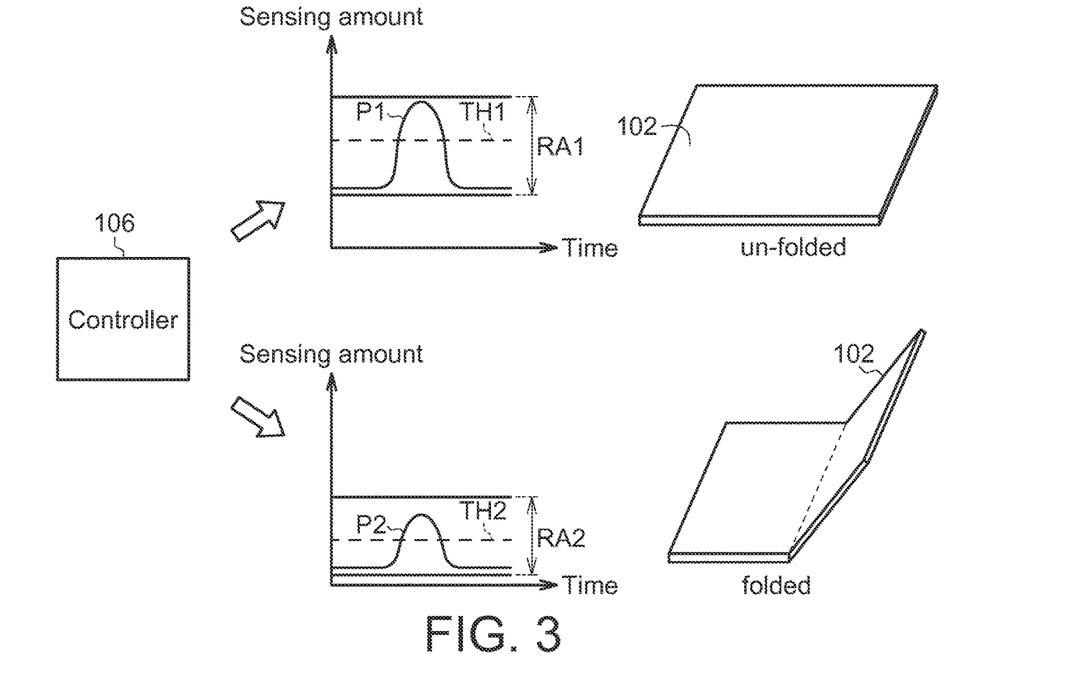
FIG. 3 illustrates exemplary responses of a touch input under different bending states of the flexible touch panel.

FIG. 3 illustrates exemplary responses of a touch input under different bending states of the flexible touch panel 102. In FIG. 3, the waveform P1 represent a touch event applied on the flexible touch panel 102 that is in an un-folded state, while the waveform P2 represent a touch event applied on the flexible touch panel 102 that is in a folded state, wherein TH1 and TH2 are thresholds for determining whether the touch input is received. For example, if the sensing amount (e.g., voltage/current) of the touch event P1 is higher than the threshold TH1, it will be regarded as a meaningful touch input; otherwise, it will be regarded as noise and ignored by the following signal processing.

As mentioned earlier, different bending states of the flexible touch panel 102 may result in different RC loads to the controller 106. Thus, when the flexible touch panel 102 is in different bending states, the same touch event may introduce different responses, such as the waveforms P1 and P2 shown in FIG. 3. In such instance, the controller 106 may dynamically adjust its load drive capability to meet the RC loads under different bending states of the flexible touch panel 102, thereby saving the power consumption and improving the resolution of the backend circuit (e.g., analog to digital converter (DAC)) for processing the touch input.

As shown in FIG. 3, when the bending state of the flexible touch panel 102 changes from the un-folded state to the folded state, the signal sensing range for the touch input may change from RA1 to RA2 due to the adjustment of the load drive capability of the controller 106. After adjusting the load drive capability setting, the controller 106 may update the threshold for detecting whether the touch input is received, that is, converting the threshold TH1 to TH2. In an embodiment, when the flexible touch panel 102 is in a first bending state, the controller 106 may select one of the predetermined load drive capability settings as the load drive capability setting to sense the touch input with a first signal sensing range. When the flexible touch panel 102 is in a second bending state, the controller 106 may select another one of the predetermined load drive capability settings as the load drive capability setting to sense the touch input with a second signal sensing range.

Figure 4:
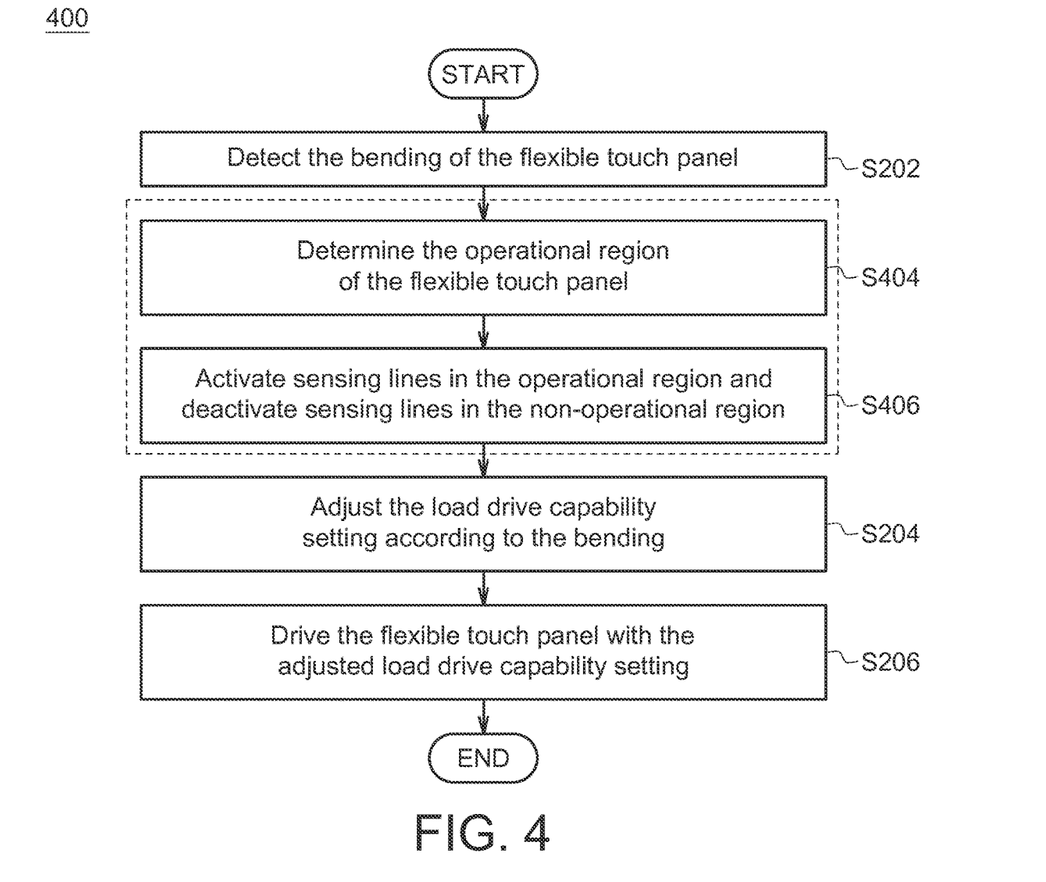
FIG. 4 is a flowchart of an operating method of the touch control device 100 according to an embodiment of the present disclosure.

FIG. 4 is a flowchart 400 of an operating method of the touch control device 100 according to an embodiment of the present disclosure. The main difference between the flowchart 400 and the flowchart 200 is that the flowchart 400 further involves noise reduction mechanism for the non-operational touch region of the flexible touch panel 102.

As shown in FIG. 4, after the controller 106 detects the bending of the flexible touch panel 102 (step S202), the controller 106 may determine the operational region of the flexible touch panel 102 (step S404). The controller 106 may control the switches SW for the sensing lines RL to activate the sensing lines RL in the operational touch region and to deactivate the sensing lines RL disposed in the non-operational touch region (step S406), such that signals from the non-operational touch region can be blocked. Then, the controller 106 may execute steps S204 and S206 shown in FIG. 2 to choose a suitable load drive capability setting to drive the flexible touch panel 102. Note that the present disclosure is not limited to the above example. In another embodiment, the adjustment of the load drive capability setting (i.e., step S204) can be executed prior to the noise reduction procedure (i.e., steps S404 and S406). In still another embodiment, both of the adjustment of the load drive capability setting and the noise reduction procedure can be simultaneously executed.

Figure 5:
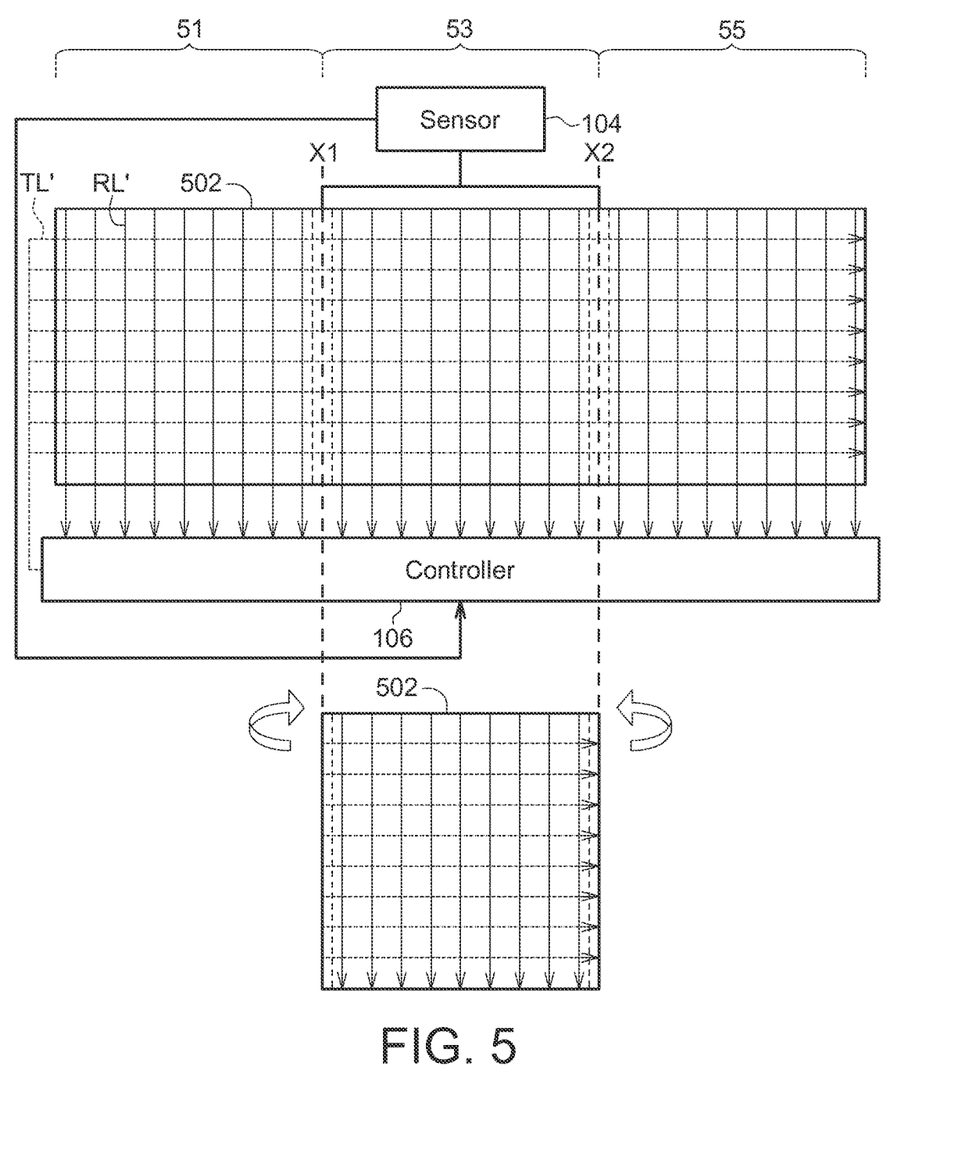
FIG. 5 illustrates an exemplary flexible touch panel according to an embodiment of the present disclosure.

FIG. 5 illustrates an exemplary flexible touch panel 502 according to an embodiment of the present disclosure. The flexible touch panel 502 is divided into a plurality of touch regions 51, 53 and 55, wherein a bending axis X1 is defined at the junction between the touch regions 51 and 53, and a bending axis X2 is defined at the junction between the touch regions 53 and 55. It is understood that even though in FIG. 5 the number of the touch regions is exemplified by three, the present disclosure not limited thereto, as any number of touch region can be defined in a flexible touch panel according to practical needs. Additionally, in an embodiment, the flexible touch panel 502 having multiple touch regions may be formed by a single layer rather than splicing a plurality of sub-panels together.

To detect the bending state of the flexible touch panel 502, one or more sensors 104 may be embedded in or disposed at the bending axis X1 and X2. The flexible touch panel 502 comprises a plurality of scanning lines TL' passing through the flexible touch panel 502 and a plurality of sensing lines RL' interested with the scanning lines TL'. Similar to the flexible touch panel 102 shown in FIG. 1, the sensing lines RL' can be activated or deactivated by the controller 106. For example, if the touch region 53 is selected as an operational touch region that is provided to the user to perform touch operation while the other touch regions 51 and 55 are selected as non-operational touch regions (e.g., bending to the backside of the flexible touch panel 502), the controller 106 may activate the sensing lines RL located in the touch region 53 and deactivate the sensing lines RL' located in the non-operational touch regions 51 and 55. Thus, even the surfaces of the touch regions 51 and 55 may contact to the backside of the flexible touch panel 502 as they have been bended, unwanted touch interference from the touch regions 51 and 55 can still be ignored/blocked. Similarly, when the touch region 51 is selected as the operational touch region, the controller 106 may activate the sensing lines RL' located in the touch region 51 and deactivate the sensing lines RL' located in the non-operational touch regions 53 and 55. Again, when the touch region 55 is selected as the operational touch region, the controller 106 may activate the sensing lines RL' located in the touch region 55 and deactivate the sensing lines RL' located in the non-operational touch regions 51 and 53. In other words, to reduce touch interference for each bending state of the flexible touch panel 502, the controller 106 may only activate the sensing lines RL' located in the operation touch region.

Figure 6:
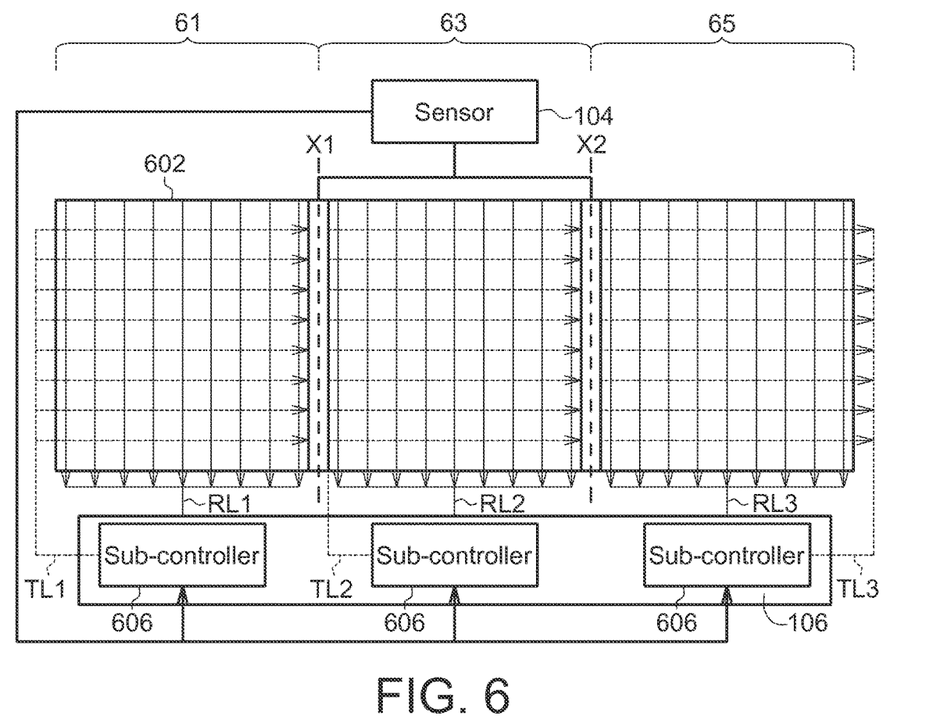
FIG. 6 illustrates an exemplary flexible touch panel according to an embodiment of the present disclosure.

FIG. 6 illustrates an exemplary flexible touch panel 602 according to an embodiment of the present disclosure. In the embodiment, the scanning lines and the sensing lines are separated into a plurality groups that each of which is corresponding to a touch region of the flexible touch panel 602. As shown in FIG. 6, the touch region 61 comprises scanning lines TL1 and sensing lines RL1, the touch region 63 comprises scanning lines TL2 and sensing lines RL2, and the touch region 65 comprises scanning lines TL3 and sensing lines RL3. The wirings of these scanning/sensing lines between each touch region are basically independent to each other. Note that, in an embodiment, the flexible touch panel 602 may also be formed by a single layer rather than splicing a plurality of sub-panels together.

Compared to the flexible touch panel 502 shown in FIG. 5, the scanning lines TL1/TL2/TL3 of the flexible touch panel 602 are for their corresponding touch regions instead of passing through the whole flexible touch panel 602. Thus, if one of the touch regions (e.g., touch region 61) is selected as the operational touch region while others (e.g., touch regions 63 and 65) are non-operational touch regions, the controller 106 may deactivate both of the scanning lines (e.g., scanning lines TL2 and TL3) and the sensing lines (e.g., sensing lines RL2 and RL3) located in the non-operational touch regions to block touch events therefrom. Besides, in an embodiment, the controller 106 may include multiple sub-controllers 606 that each of which may control a corresponding touch region according to the bending information obtained from the sensor 104, as shown in FIG. 6.

Figure 7:
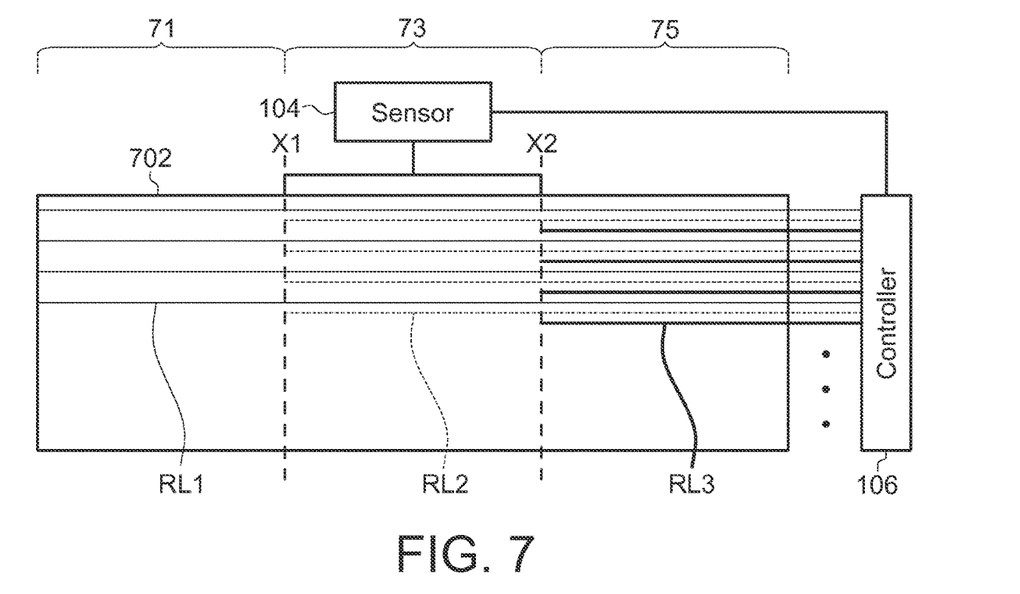
FIG. 7 illustrates an exemplary flexible touch panel according to an embodiment of the present disclosure.

FIG. 7 illustrates an exemplary flexible touch panel 702 according to an embodiment of the present disclosure. In the embodiment, touch events on a touch region is sensed by the sensing lines that are extended to one side of the touch region. In FIG. 7, the touch region 71, 73 and 75 are arranged in line and separated by the bending axis X1 and X2. The sensing lines RL1' may pass through the touch regions 73 and 75 to extend to one side of the touch region 71, the sensing lines RL2' may pass through the touch region 75 to extend to one side of the touch region 73, and the sensing lines RL3' may be extended to one side of the touch region 75, wherein the sensing lines RL1', RL2' and RL3' are arranged to detect touch inputs on the touch regions 71, 73 and 75, respectively. Similar to the previous descriptions, the controller 106 may selectively deactivate the sensing lines for the non-operational regions according to the bending information obtained from the sensor 104. Additionally, in an embodiment, the flexible touch panel 702 may also be formed by a single layer rather than splicing a plurality of sub-panels together.

In summary, the proposed disclosure provides a technology to drive a flexible touch panel with an adjustable load drive capability setting to meet the RC load corresponding to the current bending type of the flexible touch panel, so that the overall power consumption of the touch control device can be reduced. Moreover, the proposed technology may also selectively deactivate the sensing lines disposed in the non-operational touch region of the flexible touch panel to further reduce unwanted touch interference.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A touch control device, comprising:
   a flexible touch panel comprising a plurality of scanning lines and a plurality of sensing lines intersected with the scanning lines, configured to receive a touch input;
   a sensor, configured to detect a bending of the flexible touch panel; and
   a controller, configured to generate scanning signals to be applied to the scanning lines based on a load drive capability setting, wherein the controller adjusts the load drive capability setting to meet an RC load corresponding to the bending of the flexible touch panel to adjust the scanning signals to be applied to the scanning lines, wherein adjusting the load drive capability setting is to change at least one of number, duty cycle and frequency of the scanning signals, and then the controller applies the adjusted scanning signals to the scanning lines.

2. The touch control device according to claim 1, wherein the controller is configured to select one of a plurality of predetermined load drive capability settings as the load drive capability setting according to the bending of the flexible touch panel, and each of the predetermined load drive capability settings is for a bending state of the flexible touch panel.

3. The touch control device according to claim 2, wherein the bending states for the predetermined load drive capability settings comprise a first state indicating that the flexible touch panel is folded or curved and a second state indicating that the flexible touch panel is un-folded or non-curved.

4. The touch control device according to claim 2, wherein when the flexible touch panel is in a first bending state, the controller is configured to select one of the predetermined load drive capability settings as the load drive capability setting to sense the touch input with a first signal sensing range, and when the flexible touch panel is in a second bending state, the controller is configured to select another one of the predetermined load drive capability settings as the load drive capability setting to sense the touch input with a second signal sensing range.

5. The touch control device according to claim 1, wherein the controller is configured to update a threshold for detecting whether the touch input is received after adjusting the load drive capability setting.

6. The touch control device according to claim 1, wherein the sensing lines are configured to provide responses of the touch input in terms of the scanning signals.

7. The touch control device according to claim 1, wherein the flexible touch panel is divided into a plurality of touch regions and the sensing lines comprise:
a plurality of first sensing lines for sensing the touch input from a first touch region of the touch regions; and
a plurality of second sensing lines for sensing a second touch region of the touch regions;
wherein the first sensing lines are deactivated by the controller when the second touch region is selected as an operational region, and the second sensing lines are deactivated by the controller when the first touch region is selected as the operational region.

8. The touch control device according to claim 7, wherein the scanning lines comprise a plurality of first scanning lines disposed in the first touch region and a plurality of second scanning lines disposed in the second touch region;
wherein both of the first sensing lines and the first scanning lines are deactivated by the controller when the second touch region is selected as the operational region, and both of the second sensing lines and the second scanning lines are deactivated by the controller when the first touch region is selected as the operational region;
the first sensing lines are disposed in the first touch region but not in the second touch region, and the second sensing lines are disposed in the second touch region but not in the first touch region.

9. The touch control device according to claim 7, wherein the first touch region and the second touch region are arranged in line, the first sensing lines are extended to one side of the first touch region, and the second sensing lines pass through the first touch region to extend to one side of the second touch region.

10. An operating method of a touch control device comprising a controller, a sensor and a flexible touch panel comprising a plurality of scanning lines and a plurality of sensing lines intersected with the scanning lines, comprising:
detecting a bending of the flexible touch panel by the sensor;
generating scanning signals to be applied to the scanning lines based on a load drive capability setting by the controller; and
adjusting the load drive capability setting to meet an RC load corresponding to the bending of the flexible touch panel to adjust the scanning signals to be applied to the scanning lines, and then the controller applies the adjusted scanning signals to the scanning lines,
wherein adjusting the load drive capability setting is to change at least one of number, duty cycle and frequency of the scanning signals.

11. The operating method according to claim 10, wherein said adjusting the load drive capability setting comprises:
selecting one of a plurality of predetermined load drive capability settings as the load drive capability setting, wherein each of the predetermined load drive capability settings is for a bending state of the flexible touch panel.

12. The operating method according to claim 11, wherein the bending states for the predetermined load drive capability settings comprise a first state indicating that the flexible touch panel is folded or curved and a second state indicating that the flexible touch panel is un-folded or non-curved.

13. The operating method according to claim 11, wherein when the flexible touch panel is in a first bending state, the controller is configured to select one of the predetermined load drive capability settings as the load drive capability setting to sense the touch input with a first signal sensing range, and when the flexible touch panel is in a second bending state, the controller is configured to select another one of the predetermined load drive capability settings as the load drive capability setting to sense the touch input with a second signal sensing range.

14. The operating method according to claim 10, further comprising:
updating a threshold for detecting whether the touch input is received after adjusting the load drive capability setting of the controller.

15. The operating method according to claim 10, wherein the sensing lines are configured to provide responses of the touch input in terms of the scanning signals.

16. The operating method according to claim 10, wherein the flexible touch panel is divided into a plurality of touch regions and the sensing lines comprise a plurality of first sensing lines for sensing the touch input from a first touch region of the touch regions and a plurality of second sensing lines for sensing the touch input from a second touch region of the touch regions, and the operating method further comprises:
selecting one of the touch regions as an operational touch region;
activating the first sensing lines and deactivating the second sensing lines when the first touch region is selected as the operational touch region; and
activating the second sensing lines and deactivating the first sensing lines when the second touch region is selected as the operational touch region.

17. The operating method according to claim 16, wherein the scanning lines comprise a plurality of first scanning lines disposed in the first touch region and a plurality of second scanning lines disposed in the second touch region, and the operating method further comprises:

deactivating both of the first sensing lines and the first scanning lines when the second touch region is selected as the operational region; and deactivating both of the second sensing lines and the second scanning lines when the first touch region is selected as the operational region.

18. The operating method according to claim 16, wherein the first touch region and the second touch region are arranged in line, the first sensing lines are extended to one side of the first touch region, and the second sensing lines pass through the first touch region to extend to one side of the second touch region.

19. A flexible touch panel, comprising:

a plurality of scanning lines coupled to a controller;

a plurality of sensing lines intersected with the scanning lines and providing responses of a touch input in terms of the scanning signals;

wherein the controller is configured to generate scanning signals to be applied to the scanning lines based on a load drive capability setting, and the controller adjusts the load drive capability setting to meet an RC load corresponding to the bending of the flexible touch panel to adjust the scanning signals to be applied to the scanning lines, wherein adjusting the load drive capability setting is to change at least one of number, duty cycle and frequency of the scanning signals, and then the controller applies the adjusted scanning signals to the scanning lines.

20. The flexible touch panel according to claim 19, wherein at least one of the sensing lines are selectively deactivated according to the bending state of the flexible touch panel.

* * * * *